Patented Nov. 25, 1930

1,782,484

UNITED STATES PATENT OFFICE

REGINALD WILLIAM SPENCER, OF SOUTH KIRKBY, NEAR PONTEFRACT, AND HARRY PERCY HARRIS, OF SUTTON COLDFIELD, ENGLAND

PIPE JOINT

Application filed December 31, 1927, Serial No. 244,001, and in Great Britain August 18, 1927.

This invention relates to pipe joints, more particularly to that class of flexible joints having an inner member within the splayed ends of the pipes, said ends being clamped against the periphery of the inner member by an outer securing member.

Hitherto, packing has usually consisted of resilient material housed in a groove or grooves in the periphery of the inner member or in the interior surface of the pipe ends and is limited in its area of contact relatively to the bearing surface of the joint so that when under compression it functions, over a limited area, by its resiliency in effecting a fluid tight closure against the surfaces between which it is disposed and under movement of the joint, the packing is still only effective over the limited area. Such a packing, which mostly has consisted of rubber or a similar material or composition of such material, is, especially when used in joints of the type where movement of the parts is permitted, as for example in joints having spherical bearing surfaces permitting movement of the pipes in any plane about the centre or centres of the joint, liable to be rubbed or worn away and, owing to the limited area of contact, ultimately become ineffective or useless.

The object of this invention, therefore, is to provide improved means overcoming this disadvantage and to this end a pipe joint is characterized in that the splayed end of a pipe is provided with one or more grooves, recesses or the like in the interior surface thereof into which, packing of any suitable material or metal is inserted and adapted to conform or approximately so, to the shape of the splayed end and function both as a sealing agent and a bearing surface for an inner member of the joint, said packing assuming an integral part of the pipe end in order to function, under compression contact, as the bearing surface movable, with the pipe end, over the inner member.

According to one form of this invention and as applied to joints of the kind wherein the ends of the pipes are spherically splayed to fit over an exteriorly spherically surfaced inner member and in a spherically surfaced outer member so as to be capable of movement over the inner member, the spherical end of each pipe is formed or otherwise provided with a shallow annular groove extending in width to a little less than the extent of the splayed end and in this groove is inserted packing, for example vulcanite, lead, nickel or other suitable alloy, asbestos, or other suitable metal or material which will effectively form a sealing agent or medium between the pipe end and the inner spherical member and also function as a bearing surface for the inner member under compression contact, the inner member having a turned, ground or other smooth or planished surface.

It is here convenient to point out that in pipe joints of the form described in the preceding paragraph, that is pipes having spherically splayed ends, the said ends cannot be commercially produced perfectly accurate, for instance, there may be "scores" or other irregularities in the interior spherical surface and should ordinary packing rings of rubber having a comparatively small cross sectional area, be used they may not be effective in completely sealing the joint, especially under movement of the joint taking place, whereas when the packing extends over a substantial area of the spherical surfaces and is embedded in the pipe ends it functions as a bearing surface integral with the pipe ends and accommodates itself to any irregularities in the said spherical surfaces of the pipe ends and thereby effectively seals the joint under any movement of the joint.

Referring to the drawing filed herewith:—

Fig. 1 is a sectional elevation of one form of pipe joint made in accordance with this invention;

Figs. 2 to 10, inclusive, are various modified forms of pipe joints;

$a$, $a$ are two pipes each having a splayed end $b$ spherical in form and fitting over an exteriorly sphered inner member $c$ having a smooth surface. Partly enclosing the two pipe ends is an outer securing member $d$ having interiorly sphered surfaces to fit the pipe ends. In the interior surface of each pipe end is an annular shallow groove $e$ adapted to receive packing $f$, for example lead, sufficient to at least lie flush with or slightly proud of the normal surface of the interior splayed end and in this way the packing forms a sealing agent between the inner member $c$ and outer member $d$ whilst it also constitutes a bearing surface over the inner member in continuity with, or in lieu of, the interior of the pipe end and conforming to the spherical shape of said pipe end, thereby minimizing wear on the sealing agent and permitting the maximum amount of contact to be maintained.

It will also be seen that the packing or sealing agent becomes, in use, embedded in the pipe end and functions as an integral part thereof.

Further, contact between the bearing surfaces will be maintained without utilizing the elasticity of the packing and flexibility of the joint ensured.

The annular groove $e$ may be formed in the pipe ends in any convenient manner, as for example by being cast in where cast iron pipes are used, or it may be turned or pressed and to facilitate the forming of the annular groove in the spherical ends of the pipe where the pipe ends are splayed out by a mandrel or the like, the sides of said groove may be arranged approximately tangentially.

Figure 12:
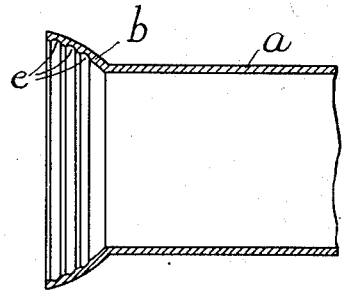
Fig. 12 is a sectional view of a pipe end showing a modified form for housing the packing.

In a modification the inner spherical surface of the pipe ends may be formed with a plurality of grooves $e$ of any form, or it may be corrugated as shown in Fig. 12 in order to more effectively retain the packing embedded within the pipe end.

In some cases the packing $f$ may be pressed or otherwise worked into the groove or grooves $e$ with the splaying out of the pipe end.

As is shown in the several figures, various forms of inner members $c$ and outer securing members $d$ may be employed for coupling the ends of the pipes together whilst in some cases the joint may have a common centre, that is, all the spherical surfaces or zones of the members of the joint are disposed about one and the same centre.

Figure 1:
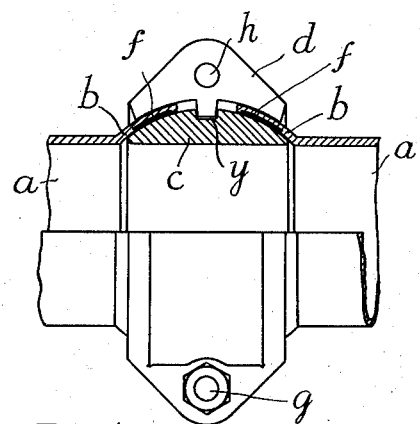
Figure 2:
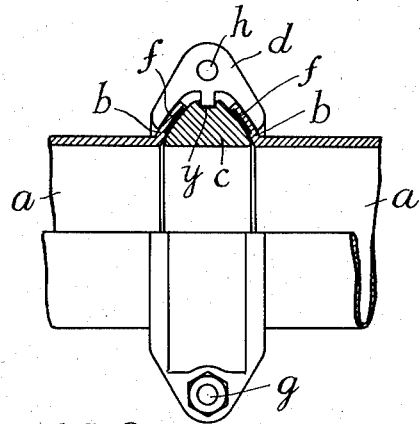
Figure 3:
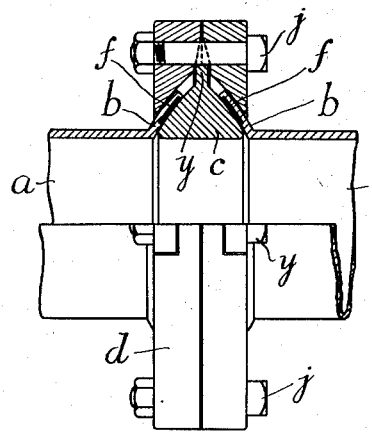
Figure 4:
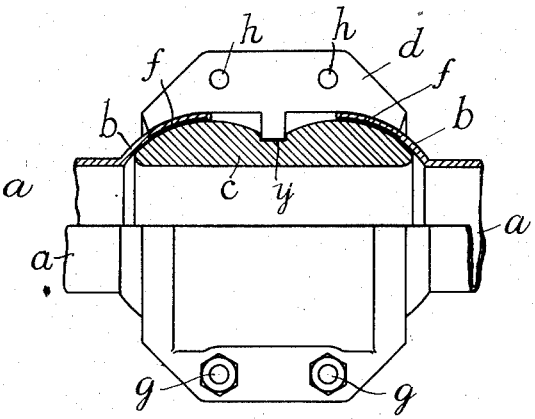

For example, in Fig. 1 the joint has a common centre whilst in Figs. 2 to 10, inclusive, the centres of each pipe end and its complementary adjacent surfaces are spaced apart. The outer securing member $d$, shown in Figs. 1, 2 and 4, comprises two half members connected together by transverse bolts $g$ through the bolt holes $h$, whilst in Fig. 3 they are connected together by longitudinal bolts $j$.

Figure 5:
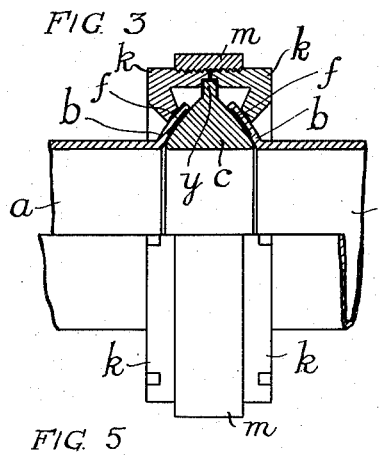
Figure 10:
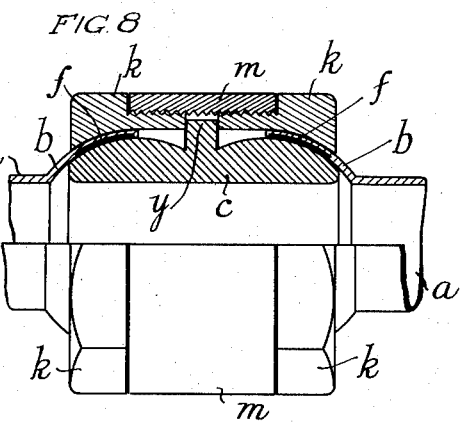
Figure 11:
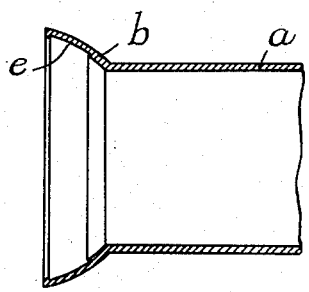
Fig. 11 is a sectional view showing a pipe end with the packing omitted.

In Figs. 5 and 10, two half rings $k$ on each pipe end have an exterior screw thread for engagement by an interiorly screw threaded concentric ring $m$.

Figure 6:
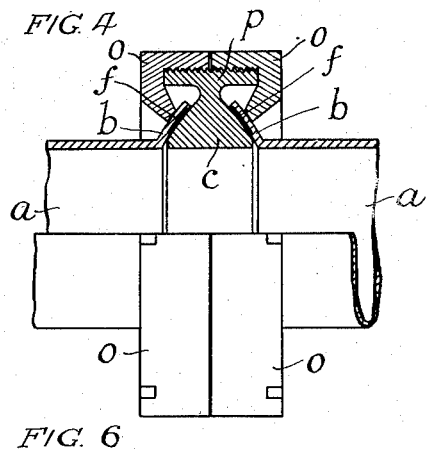

Referring to Fig. 6, it will be seen that a ring $o$ on each pipe end is interiorly threaded and engages a screw threaded protrusion $p$ of the inner member $c$.

Figure 7:
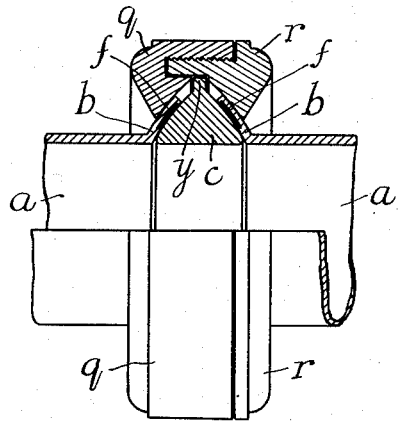

Fig. 7 shows a form of outer securing member composed of a member $q$ on one pipe end having a screw thread engagement with a member $r$ on the other pipe end.

Figure 8:
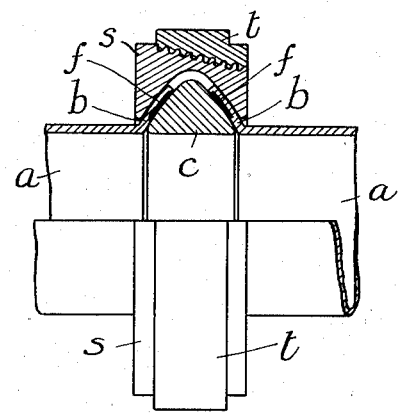

Coming now to Fig. 8, the outer securing member comprises an exteriorly screw threaded split ring $s$ fitting over both pipe ends and engaged by an interiorly screw threaded outer concentric ring $t$, the screw thread engagement of the two members being of tapering form.

Figure 9:
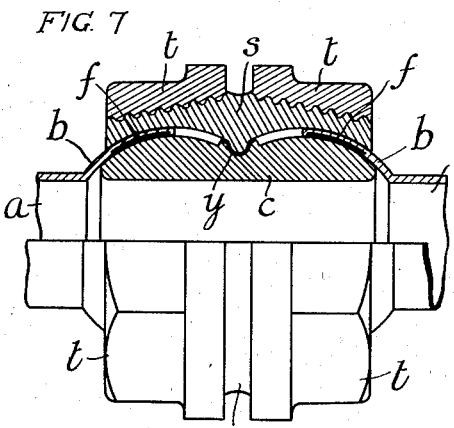

Fig. 9 is very similar to Fig. 8, except that two members $t$ are employed separately engaging the inner member $s$, one over each pipe end.

A connection between the inner member $c$ and outer securing member $d$ of the joint may be provided, for example, in the form of an annular flange and groove engagement $v$ as shown in Figs. 1 to 5, inclusive, Figs. 7, 9 and 10.

What we claim and desire to secure by Letters Patent, is:—

A pipe joint comprising two spherically splayed pipe ends each spherically zoned interiorly and exteriorly in parallel and enclosing in opposing relation about centres spaced apart a spherically zoned inner hollow member having two adjoining exterior spherical surfaces whose largest spheres are less than the greatest diameter of said inner hollow member, said largest diameter being constituted by an annular flange of the inner hollow member, packing located in the grooved interior spherical zone of each pipe end and abutting the contacting spherical surface of the inner hollow member, an interiorly spherically zoned outer securing member of at least two parts, said parts having a screw thread engagement with one another, the outer securing member engaging the annular flange of the inner hollow member.

In testimony whereof, we affix our signatures.

REGINALD WILLIAM SPENCER.
HARRY PERCY HARRIS.